April 22, 1958 H. W. VAN NESS 2,832,033
ELECTRIC DISCHARGE APPARATUS
Filed April 19, 1954 2 Sheets-Sheet 1

WITNESSES: SEQUENCE TIMER INVENTOR
Hubert W. Van Ness.
BY
ATTORNEY

United States Patent Office 2,832,033
Patented Apr. 22, 1958

2,832,033
ELECTRIC DISCHARGE APPARATUS

Hubert W. Van Ness, East Aurora, N. Y., assignor to Westinghouse Electric Corporation, East Pittsburgh, Pa., a corporation of Pennsylvania Application April 19, 1954, Serial No. 424,095

11 Claims. (Cl. 323—18)

My invention relates to electric discharge apparatus and has particular relation to timing apparatus for controlling a sequence of operations, such as that involved in resistance welding.

My invention is an outgrowth of my work on the invention disclosed in application Serial No. 378,446, filed September 4, 1953, to Edward C. Hartwig and Hubert W. Van Ness (hereinafter called Hartwig-Van Ness application). My invention also relates to applications, Serial No. 378,546, filed September 4, 1953, to Edward C. Hartwig, application Serial No. 378,444, now Patent No. 2,748,343, filed September 4, 1953, to Edward C. Hartwig and Hubert W. Van Ness, and my application, Serial No. 424,094, filed April 19, 1954. The above, mentioned four applications are incorporated in this application by reference.

The Hartwig-Van Ness application, in its specific aspects, relates to a sequence timer for pulsation resistance welding. Such a sequence timer operates to actuate the apparatus supplying the welding current to supply current during the welding interval in a series of pulse trains impressed during discrete time intervals between which predetermined currentless time intervals intervene. The intervals during which welding current flows are called the heat intervals and the currentless intervals are called the cool intervals. Pulsation welding is used in the welding of thick materials.

It is an object of my invention to provide a sequence timer particularly suitable for timing pulsation welding which shall be of simpler structure and of lower cost than the sequence timer disclosed in the Hartwig-Van Ness application.

Another object of my invention is to provide a novel electronic circuit particularly suitable for use in a pulsation sequence timer of the above-described type.

A more specific object of my invention is to provide a novel electronic circuit including a discharge device which shall be repeatedly rendered conducting and non-conducting in a predetermined sequence.

In accordance with my invention, I provide apparatus including a plurality of electric discharge devices, one of which may be called the repeat device and may be connected to produce the repeat operation described above; that is, repeat operation similar to that produced in turning the welding current on and off during the weld interval in pulsation welding. This repeat device has a control electrode and a plurality of principal electrodes. The other devices are connected to be selectively rendered conducting and to supply control potentials for rendering the one device conducting and non-conducting in the proper timed relationship. Specifically, two devices control the repeat device, one of the controlling devices being in the quiescent condition of my apparatus maintained conducting, while the other is maintained non-conducting. So long as either one of the control devices is maintained non-conducting, the potential in the control circuit of the repeat device is such as to maintain the latter non-conducting; when both control devices conduct, the repeat device is conducting. After the operation of the apparatus is initiated, the non-conducting control device is rendered conducting to cause the repeat device to conduct and produce the operation of the welding apparatus. Thereafter, the wholly conducting control device is rendered non-conducting and conducting at intervals to render the repeat device conducting repeatedly and produce the desired repeat operation.

The novel features that I consider characteristic of my invention are disclosed generally above. The invention itself both as to its organization and its method of operation together with additional objects and advantages thereof will be understood from the following description of specific embodiments when read in connection with the accompanying drawings in which.

Figure 1:
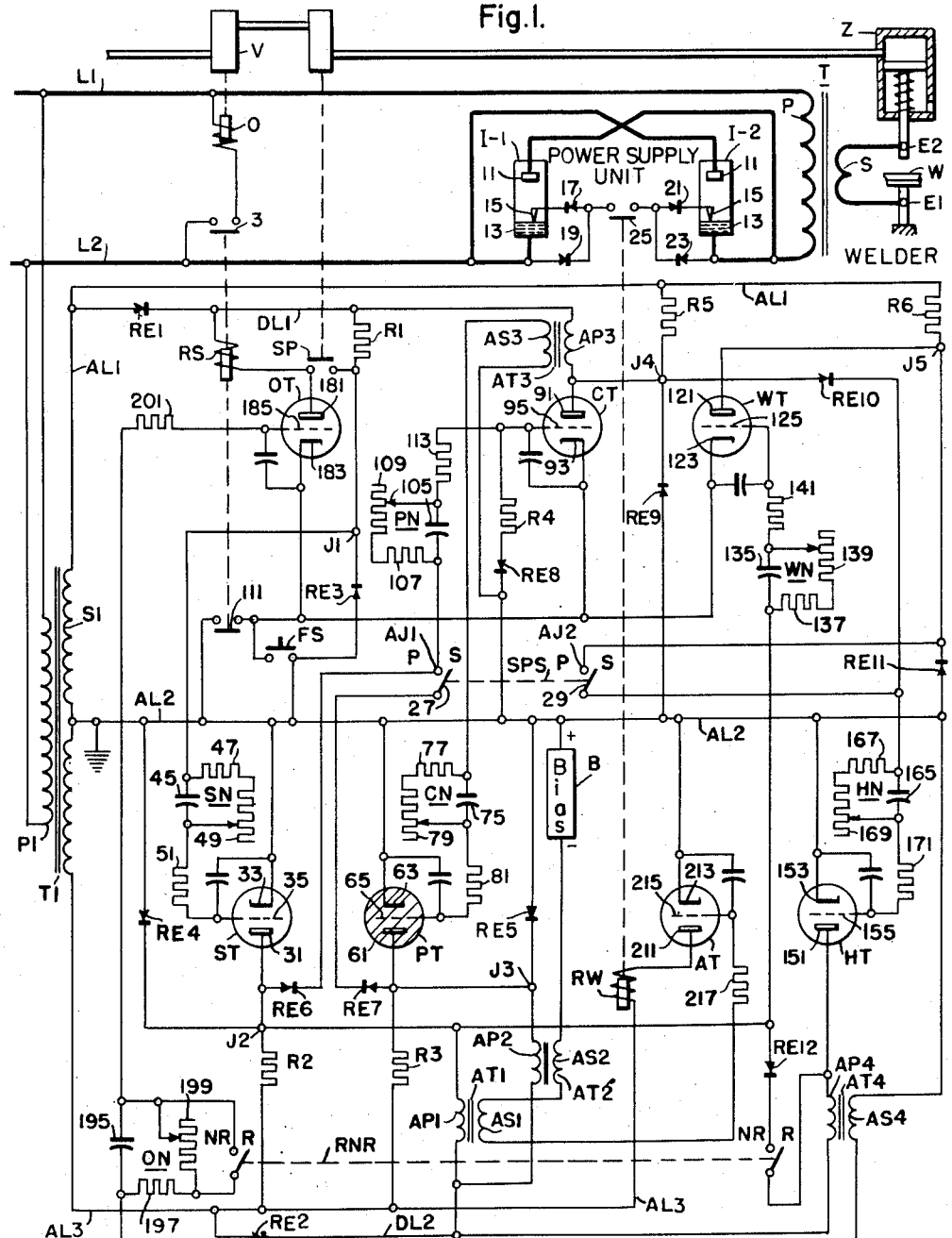
Figure 1 is a circuit diagram of a preferred embodiment of my invention.

Description.—Figure 1

The apparatus shown in Fig. 1 includes a Welder, a Power Supply Unit and a Sequence Timer. This apparatus is supplied from conductors or buses L1 and L2 which may derive their power from the buses of a commercial source. Auxiliary conductors AL1, AL2 and AL3, and DL1 and DL2 are provided for supplying the sequence timer. The conductors AL1 and AL2 derive their power from the conductors L1 and L2 through the secondary S1 of transformer T1, the primary P1 of which is connected between conductors L1 and L2. The secondary S1 has a pair of terminal taps and an intermediate tap which is preferably grounded. The terminal taps are connected to conductors AL1 and AL3 and the intermediate tap is connected to conductor AL2. Conductor DL1 is supplied from conductor AL1 through a rectifier RE1 poled to conduct positive current from conductor AL1 to conductor DL1. Conductor DL2 is supplied from conductor AL3 through another rectifier RE2 poled to conduct positive current from conductor AL3 to conductor DL2. By positive current I mean the flow of positive ions or so-called holes as distinct from electrons.

The Welder includes a fixed electrode E1 and a movable electrode E2 between which the work W is to be interposed. The electrode E2 is actuated by fluid produced within a cylinder Z. The fluid is controlled by a valve V which is actuable by a solenoid O. The solenoid O is supplied from conductors L1 and L2 through a normally open contact 3 of starting relay RS in the Sequence Timer. The Welder also includes a back pressure switch SP which is connected in the Sequence Timer. This switch is normally open and is closed only when adequate pressure is built up on the electrode E2.

The Welder also includes a welding transformer T having a primary P and a secondary S. The secondary S is connected to the electrodes E1 and E2, and when current flows through the primary P, welding current is induced in the secondary S and flows through the electrodes and the work W.

The Power Supply Unit includes a pair of ignitrons I–1 and I–2 connected in a so-called electronic contactor circuit. Each ignitron has an anode 11, a cathode 13, and an igniter 15. Between each cathode 13 and each igniter 15, a pair of rectifiers 17 and 19 and 21 and 23 are connected in such a sense as to conduct positive current from the cathode 13 to the igniter 15 externally of the ignitron I–1 or I–2. The junctions of the rectifiers 17 and 19 and 21 and 23 are adapted to be interconnected by a contact 25 of a relay RW which is controlled from the Sequence Timer.

The Sequence Timer includes a plurality of thyratrons, a squeeze thyratron ST, a heat thyratron PT, a cool thyratron CT, a weld thyratron WT, a hold thyratron HT, an off thyratron OT and an auxiliary thyratron AT. The Sequence Timer also includes a plurality of timing networks, a squeeze network SN, a heat network PN, a cool network CN, a weld network WN, a hold network HN and an off network ON.

The Sequence Timer also includes a switch SPS for setting the apparatus either for pulse operation or for spot welding operation. This switch has a pair of fixed contacts AJ1 and AJ2 which are engaged by movable contacts 27 and 29 when the switch SPS is set for pulse operation. The Sequence Timer also includes the usual repeat non-repeat switch RNR.

The squeeze thyratron ST has an anode 31, a cathode 33, and a control electrode 35. The squeeze network SN has a capacitor 45 shunted by a fixed resistor 47 and a variable resistor 49. The anode 31 is connected to the conductor DL2 through the primary AP1 of a control transformer AT1. The cathode 33 is connected to the conductor AL2. The control electrode 35 is connected through a grid resistor 51 and the network SN to the junction J1 of a resistor R1 and a rectifier RE3 connected between conductors AL2 and AL1 with the rectifier RE3 poled to conduct positive current from the conductor AL2 to the conductor AL1. A rectifier RE4 and a resistor R2, having an electrical junction J2, are also connected between the conductor AL2 and the conductor AL3 with the rectifier poled to conduct positive current from the conductor AL2 to the conductor AL3. The junction J2 is connected to the anode 31 of the thyratron ST.

The heat thyratron PT has an anode 61, a cathode 63 and a control electrode 65. The cool network CN has a capacitor 75 shunted by a fixed resistor 77 and a variable resistor 79. The anode 61 is connected through the primary AP2 of a second control transformer AT2 to the conductor DL2. The cathode 63 is connected to the conductor AL2. The control electrode 65 is connected to the conductor AL2 through a grid resistor 81, the cool network CN and the secondary AS3 of the control transformer AT3.

A rectifier RE5 and a resistor R3 are connected in series between the conductor AL2 and the conductor AL3 and have a junction J3. The rectifier RE5 is poled to conduct positive current from the conductor AL2 to the conductor AL3. The junction J3 is connected to the anode 61 of the heat thyratron PT.

A rectifier RE6 is connected between the anode 31 of the squeeze thyratron ST and the contact AJ1 poled to conduct positive current from the anode 31 to the contact AJ1. A rectifier RE7 is also connected between the anode 61 of the heat thyratron PT and the movable contact 27 of the switch SPS associated with the fixed contact AJ1. This rectifier RE7 is also poled to conduct positive current from the anode 61 to the movable contact. With the switch SPS in the closed position, the contact AJ1 of the switch is thus at the junction of the two rectifiers RE6 and RE7 poled to conduct positive current towards the junction. Potential is available to the contact AJ1 from the anode supplies of the thyratrons ST and PT unless both thyratrons are conducting.

The cool thyratron CT has an anode 91, a cathode 93, and a control electrode 95. The heat network PN has a capacitor 105 shunted by a fixed resistor 107 and a variable resistor 109. The anode 91 of the cool thyratron CT is connected through the primary AP3 of the transformer AT3 to the conductor DL1; the cathode 93 is adapted to be connected to the conductor AL2 through a starting switch FS for starting the apparatus or alternatively through the normally open contact 111 of the starting relay RS; contact 111 locks out the starting switch FS. The control electrode 95 of the cool thyratron CT is connected to the fixed contact AJ1 of the switch SPS through a grid resistor 113 and the heat network PN.

A rectifier RE8 and a resistor R4 are connected in series between the control electrode 95 and the conductor AL2. The rectifier RE8 is poled to conduct positive current from the control electrode 95 to the conductor AL2.

The resistor R4 and rectifier RE8 which maintain network PN charged during the standby condition of the apparatus tend to have an effect on the discharge rate of the network PN. But, the discharge path must of necessity be through the back resistance of rectifier RE8 and since the back resistance of most rectifiers is fairly high the value of R4 is not too critical. Since the effect of resistor R4 and rectifier RE8 is constant on the discharge calibration of the network PN, it can be anything which the designer is willing to allow. If the value is too low, it will of course reduce the effective range of adjustment by the potentiometer 107 for network PN. If on the other hand, resistor R4 is too high a value, sufficient charge will not be built up on capacitor 105 to maintain thyratron CT non-conducting. I have found that a value on the order of 100,000 ohms for resistor R4 when rectifier RE8 is a 75 milliamp selenium rectifier is quite adequate in most cases.

A rectifier RE9 and a resistor R5 having a junction J4 are also connected in series between the conductor AL2 and the conductor AL1. The rectifier is poled to conduct positive current from the conductor AL2 to the conductor AL1. The junction J4 of the rectifier RE9 and the resistor R5 is connected to the anode 91 of the cool thyratron CT.

The weld thyratron WT has an anode 121, a cathode 123, and a control electrode 125. The weld network WN has a capacitor 135 shunted by a fixed resistor 137 and a variable resistor 139. The anode 121 of the weld thyratron WT is connected to the contact AJ2 of the switch SPS. The corresponding movable contact 29 of the switch SPS is connected through a rectifier RE10 to the junction of the anode 91 of the cool thyratron CT and the primary AP3. With the switch SPS in the closed position, the anode 121 of the weld thyratron is thus connected to the conductor DL1 through the primary AP3, and the weld thyratron WT is capable of supplying current through the primary AP3 in the same manner as the cool thyratron CT. The cathode 123 of the weld thyratron WT is adapted to be connected to the conductor AL2 in the same manner as the cathode of the cool thyratron CT, either through the switch FS or through the normally open contact 111 of the start relay RS. The control electrode 125 of the weld thyratron WT is connected to the junction J2 through a grid resistor 141 and the network WN.

A rectifier RE11 and a resistor R6 having a junction J5 are connected in series between the conductor AL2 and the conductor AL1, with the rectifier RE11 poled to conduct positive current from the conductor AL2 to the conductor AL1. The junction J5 is connected to the anode 121 of the weld thyratron WT.

The hold thyratron HT has an anode 151, a cathode 153 and a control electrode 155. The hold network HN has a capacitor 165 shunted by a fixed resistor 167 and a variable resistor 169. The anode 151 of the hold thyratron HT is connected to the conductor DL2 through the primary AP4 of a control transformer AT4. The cathode 153 is connected to the conductor AL2. The control electrode 155 is connected through a grid resistor 171, the network HN, and the rectifier RE10 to the junction J4. The rectifier RE10 is poled to conduct positive current from the junction J4 to the control electrode 155. Thus, when the conductor AL1 is positive, relative to the conductor AL2, current for charging the network HN can flow through the rectifier RE10 between the control electrode 155 and the cathode 153 of the thyratron HT.

The off thyratron OT has an anode 181, a cathode 183 and a control electrode 185. The off network ON has a capacitor 195 shunted by a fixed resistor 197 and a variable resistor 199. The anode 181 of thyratron OT is connected to the conductor DL1 through the coil of the relay RS. The cathode 183 is adapted to be connected to the conductor AL2 in the same manner as the cathodes 93 and 123 of the cool thyratron CT and the weld thyratron WT through the switch FS or the normally open contact 111 of the relay RS. The control electrode 185 of the thyratron OT is connected through a grid resistor 201, the network ON, and the secondary AS4 of the transformer AT4 to the conductor AL2.

The thyratron AT has an anode 211, a cathode 213, and a control electrode 215. The anode 211 is connected to the conductor AL3 through the exciting coil of the weld relay RW. The cathode 213 is connected to the conductor AL2. The control electrode 215 is connected to the conductor AL2 through a grid resistor 217, the secondary AS1 of the transformer AT1, the secondary AS2 of the transformer AT2, and a blocking bias B.

The secondaries AS1 and AS2 produce potential in the control circuit of the thyratron AT when the thyratrons ST and PT, respectively associated with their primaries AP1 and AP2 are conducting. These potentials are so related to the blocking bias B that each tends to counteract the bias but is inadequate to counteract it entirely, but the sum of both potentials is sufficient to counteract the bias. Thus, the thyratron AT is non-conducting unless both thyratron ST and thyratron PT are conducting.

The thyratrons ST, PT, CT, WT, HT, OT, and AT are connected to operate in the same manner as corresponding components of the apparatus disclosed in the Hartwig-Van Ness application. As in this apparatus, sufficient inductive reactance is connected in the anode circuits of the thyratrons ST, PT, CT, WT, HT, OT, and AT to produce a carry-over effect. For this purpose, the inductive reactance produced by the relays RS and RW and the transformers AT1 through AT4 may be adequate and, if not, additional inductive reactance may be added.

*Figure I Stand-by*

In the stand-by condition of the apparatus, the power switches or circuit breakers (not shown) through which power is supplied to the conductors L1 and L2 are closed, and the transformer T1 is energized. The heaters (not shown) for the cathodes 33, 63, 93, 123, 153, 183, and 213 of the various thyratrons ST, PT, CT, WT, HT, OT, and AT are also energized, and the thyratrons are ready to conduct.

Since the switch FS and the normally open contact of the relay RS are both open, the cathodes 93, 123, 183 of thyratrons CT, WT, and OT are disconnected from the conductor AL2, and the thyratrons CT, WT, and OT are nonconducting. The control electrode 35 of the thyratron ST is connected through the junction J1 and the associated resistor R1 to the conductor AL3. During the first half periods when conductor AL3 is positive relative to conductor AL2, positive potential is impressed between the junction J1 and the cathode 33 of the thyratron ST, and the network SN is charged by current flowing from junction J1 through network SN, the control electrode 35 and the cathode 33 to conductor AL2. The network SN is thus charged to such magnitude and at such polarity as to maintain the thyratron ST nonconducting.

With the thyratron ST nonconducting, potential is impressed from the conductor DL2 through the primary AP1, the rectifier RE6 connected to the anode 31 of the thyratron ST, the contact AJ1, the network PN, the grid resistor 113 of thyratron CT, and the resistor R4 and rectifier RE8 connected to the conductor AC2 to charge the network PN. This charge is of such magnitude and polarity as to prevent the thyratron CT from conducting immediately following the closing of its cathode circuit by the switch FS.

Since thyratrons CT and WT are non-conducting, transformer AT3 is quiescent, and the network CN is uncharged. The heat thyratron PT is then conducting. This thyratron supplies current through the primary AP2 of the transformer AT2, impressing potential in the control circuit of the thyratron AT. But this potential, while it tends to counteract the bias B, is not sufficient to fully counteract it and thyratron AT is non-conducting.

Since thyratron CT is non-conducting, the junction J4 is at the potential of the conductor AL1 during the half periods when this conductor is positive relative to conductor AL2. Under such circumstances, the network HN is charged during these half periods. This charge is produced in a circuit extending from the conductor AL2 through the resistor R3 associated with the junction J4, the rectifier RE10, the network HN, the grid resistor 171 associated with thyratron HT, the control electrode 155 and the cathode 153 of thyratron HT and the conductor AL2.

Because thyratron OT is non-conducting, relay RS is deenergized and the contact 3 in circuit with the solenoid O of the fluid pressure valve V is open so that the solenoid is deenergized and the valve V is open. Because thyratron AT is non-conducting, relay RW is deenergized and the contact between the igniter circuits of the ignitrons I–1 and I–2 is open so that the ignitrons I–1 and I–2 are non-conducting. Transformer T is thus in a quiescent condition and there is no current flow through the secondary S.

*Operation Figure I*

Operation of the apparatus to produce pulsation welding will first be described. For such operation the switch SPS is closed, the contact AJ1 being then connected between the rectifiers RE6 and RE7 connected respectively to the anodes 31 and 61 of the thyratrons ST and PT and the contact AJ2 being connected to the primary AP3 through RE10 so that the thyratron WT is capable of supplying current through the primary AP3. With this setting of the switch, the thyratrons remain as described in Standby–Figure I. The operation will also be described with the repeat non-repeat RNR switch in the repeat position as shown in the drawing.

To produce a weld, the work W is disposed on electrode E1 and the starting switch FS is closed. Since the network ON is at this time uncharged, the thyratron OT is immediately rendered conducting, actuating relay RS. The starting switch FS is then locked out at the lower, now closed, contact 111 of the relay RS and the circuit through the solenoid is closed at the other now closed contact. The valve V is then open and fluid flows to the cylinder Z to cause the electrode E2 to engage the work W. When adequate pressure is built up on the electrode E2 the pressure switch SP is closed.

Because the thyratron OT is conducting, the charging potential for the squeeze network SN is reduced to a low magnitude and the squeeze network SN begins to discharge and time out. At the end of the squeeze time when the network SN has sufficiently discharged, thyratron ST is rendered conducting supplying current to the primary AP1 of transformer AT1. Potential is now induced in the control circuit of thyratron AT which added to the potential produced by secondary AS2 is sufficient to counteract the blocking bias B and thyratron AT is rendered conducting supplying current through the coil of the relay RW. The relay is actuated closing the contact between the igniter circuits of the ignitrons I–1 and I–2 and the latter are each in its turn rendered conducting to supply alternating-current to the primary P of the transformer T. Welding current is then induced in the secondary S and the work W is welded.

When thyratron ST is rendered conducting, the charging potential for heat network PN is reduced and the network PN begins to discharge and time out. At the end of the heat time the cool thyratron CT is rendered conducting. This thyratron may now conduct because its cathode is connected to the conductor AL2 through the switch FS if it still remains closed and in any event through the now closed contact 111 of the relay RS. Thyratron CT, in conducting, supplies current through the primary AP3 inducing current in the secondary AS3 which charges the cool network CN through the control electrode and the cathode of the thyratron PT. The heat thyratron PT is then rendered non-conducting and the supply of current through the primary AP2 of the transformer AT2 is interrupted. In the absence of the additional potential provided by the secondary AS2 in the control circuit of the thyratron AT, the latter becomes non-conducting and relay RW becomes deenergized opening the igniter circuits, so that the supply of current through the ignitrons I-1 and I-2 is interrupted and the flow of weld current stops.

When thyratron PT is rendered non-conducting, charging current is supplied to the heat network PN in a circuit extending from the conductor DL2 through the primary AP2, and the rectifier RE7 connected to the anode 61 of thyratron PT, the movable contact 27 of switch SPS, the contact AJ1, the heat network PN, the grid resistor 113 of thyratron CT, the control electrode 95 and the cathode 93 of thyratron CT, the switch FS, if it is closed, or the now closed contact 111 of relay RS to the conductor AL2. Thyratron CT is now again rendered non-conducting, and the supply of charging current to the network CN is interrupted. This network now times out and eventually at the end of the cool time permits thyratron PT to conduct again. Thyratron AT is then again rendered conducting, relay RW is actuated, and another pulse is supplied through the ignitrons I-1 and I-2 to the transformer T, so that additional welding current is supplied to the work W.

By this latter conduction of thyratron PT, the network PN is again permitted to time out, and thereafter the cool thyratron CT is again rendered conducting, rendering the heat thyratron PT and the thyratron AT non-conducting. The above-described process continues and trains of welding current are supplied to the work W so long as the process continues.

This pulsing operation is interrupted by the operation of the weld thyratron WT which is controlled from the weld network WN. This network is connected to the junction J2, and it also begins to discharge and time out when the thyratron ST is rendered conducting. The network WN is set to continue to time out for a sufficiently long time interval to permit the flow of the desired number of trains of welding current pulses to the work W. When the network WN does time out, the thyratron WT is rendered conducting, supplying current to the primary AP3 so that the network CN is charged from the secondary AS3 and the thyratron PT is rendered non-conducting. The circuit through thyratron WT extends from conductor DL1, through primary AP3, rectifier RE10, contact 29, contact AJ2, the anode 121 and cathode 123 of thyratron WT, switch FS or contact 111 to conductor AL2. Thyratron AT now becomes non-conducting because thyratron PT is non-conducting, and relay RW is deenergized so that the supply of welding current is interrupted.

The network WN is not interconnected with the thyratron PT in the same manner as the network PN, and when thyratron WT does conduct, it continues to conduct and to maintain thyratron PT and thyratron AT non-conducting. When thyratron WT is rendered conducting, it reduces the charging potential for the network HN by shunting the junction J5 to the conductor AL2. The network HN then begins to discharge and time out. When the network HN has discharged sufficiently, the thyratron HT is rendered conducting, supplying current through the primary AP4 of transformer AT4. The network ON is then charged in a circuit extending from the lower terminal of the secondary AS4 through the network ON, the grid resistor 201 associated with thyratron OT, the control electrode 185 and the cathode 183 of thyratron OT, the switch FS and the normally closed contact 111 of relay RS to the other terminal of the secondary AS4, at conductor AL2.

Thyratron OT then immediately becomes non-conducting permitting relay RS to become deenergized. The lock-in circuit for the starting switch FS is now open at the now lower open contact 111 of the relay RS, but this operation has no effect, since in repeat welding the starting switch FS remains closed. In addition, the other contact 3 of relay RS is open so that the solenoid O is deenergized, the valve V is closed, and the electrode E2 permitted to retract from the work W. The work W, having been welded in the last position, may now be advanced to another position for another weld. In addition, by the closing of the valve V, the switch SP is opened so that the anode of thyratron OT is disconnected from junction J1.

The Sequence Timer now resets itself. Because the thyratron OT is non-conducting and is disconnected from the junction J1, the network SN is again charged rendering the thyratron ST non-conducting. The network PN had been charged when thyratron PT was rendered non-conducting following the conduction of thyratron WT, and thyratron CT remains non-conducting. Since thyratron ST is non-conducting, the network WN is charged and thyratron WT becomes non-conducting, interrupting the flow of current through the primary AP3. The network CN may now discharge and at the end of the interval for which it is set, thyratron PT becomes conducting, supplying current to the primary AP2 of transformer AT2, but this operation has no effect since, at this time, thyratron ST is non-conducting and the potential induced in the secondary AS2 alone is insufficient to completely counteract the blocking bias B. The thyratron AT then remains non-conducting. When thyratron WT becomes non-conducting, network HN is charged from junction J5 and thyratron HT becomes non-conducting. The supply of charging current through transformer AT4 to network ON is now interrupted and the network ON discharges and times out the off interval. Thereafter, if the start switch FS is still closed, thyratron OT may again conduct to start a second welding operation.

When the repeat non-repeat switch RNR is in the non-repeat position, the anode of the hold thyratron HT is connected to the network WN through a contact of the repeat non-repeat switch RNR and a rectifier RE12 poled to conduct positive current from the network WN to the anode. Under such circumstances, when the thyratron HT becomes conducting during the sequence, it prevents the recharging of network WN so long as it remains conducting. Thyratron HT remains conducting so long as thyratron WT remains conducting and this condition persists so long as the starting switch FS remains closed. Thyratron HT then is locked in conducting condition so long as the starting switch FS remains closed. Under such circumstances, the network ON remains charged and thyratron OT remains non-conducting so long as thyratron HT remains conducting. The start of a second welding operation is thus prevented until the start switch FS is reopened to render non-conducting thyratron WT, which in turn permits thyratron HT to become non-conducting and network ON to time out.

The operation of the apparatus, when set for spot welding, may now be considered. For such operation, the switch SPS is maintained open. During such operation, spot welds are produced repeatedly and the repeat non-repeat switch RNR is set for repeat.

The operation is as described when the apparatus is producing pulsation welds up to the point at which the squeeze thyratron ST is rendered conducting. At this point, the potential for charging heat network PN is reduced and the network begins to discharge and time out. At the same time thyratron AT is rendered conducting and relay RW actuated so that welding current is supplied. When network PN has timed out, thyratron CT is rendered conducting, supplying current through primary AP3 which results in the charging of network CN. Thyratron PT is then rendered non-conducting and thyratron AT stops conducting causing relay RW to become deenergized so that the supply of welding current to the work W is stopped. Since the switch SPS is open, the network PN is not now again recharged when thyratron PT becomes non-conducting. Thyratron CT then continues to conduct and to hold thyratron PT non-conducting. The conduction of thyratron CT reduces the charging potential for network HN which is connected to the junction J4, and this network now begins to discharge and time out. When this network times out, the hold thyratron HT is rendered conducting, supplying current to the transformer AT4, which, in turn, results in the charging of the network ON and the rendering non-conducting of the thyratron OT. The operation from this point is the same as the operation of the apparatus when it is set for pulsation welding. It is seen that with this switch SPS set for spot welding, thyratron WT is disconnected from the circuit and thyratron CT performs the function of weld thyratron.

Figure 2:
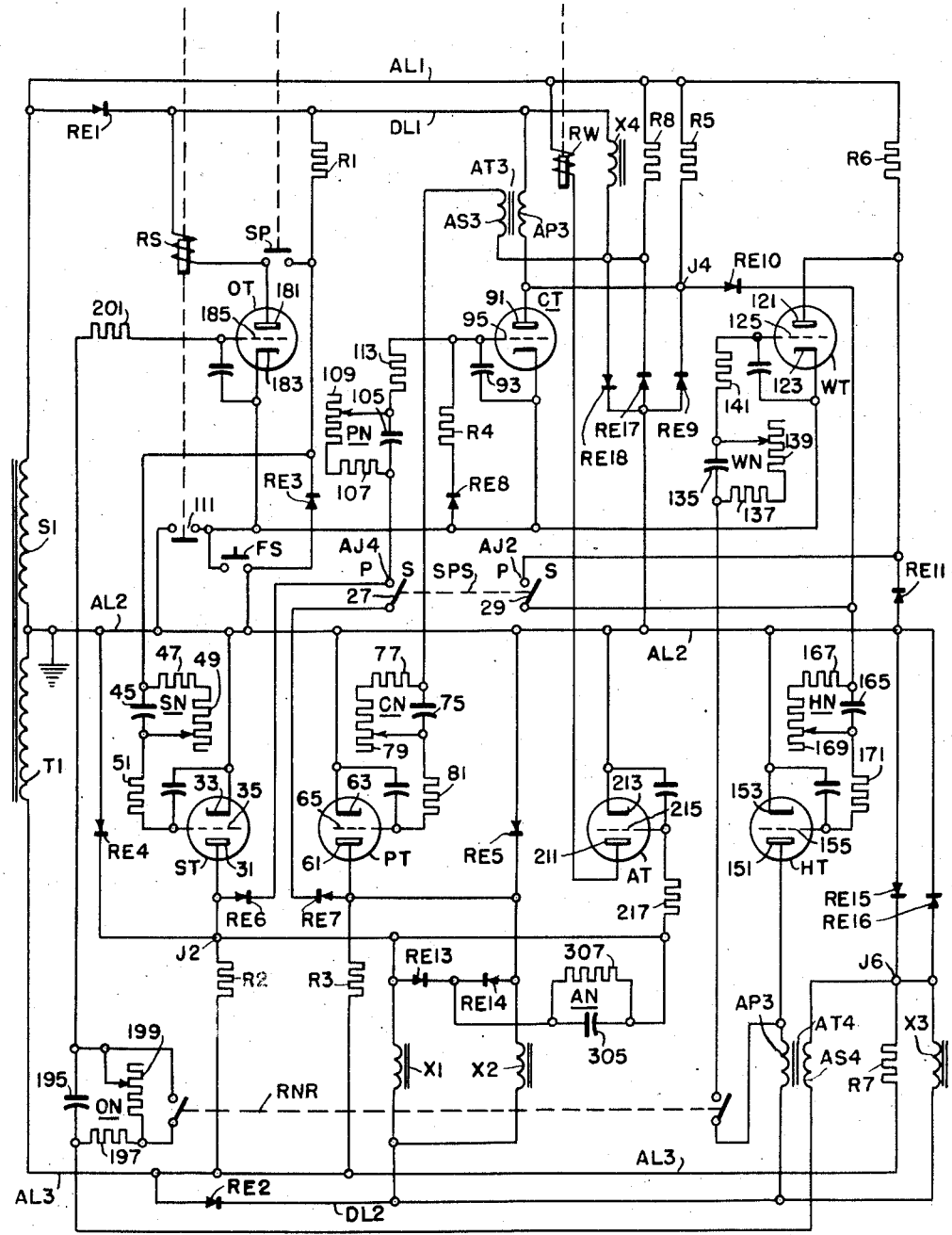
Fig. 2 is a circuit diagram of a modification of my invention.

Description.—Figure 2

The modification shown in Fig. 2 differs from the modification shown in Fig. 1 in that Fig. 2 includes a Sequence Timer which differs from the Fig. 1 Sequence Timer in the manner in which the thyratron AT is controlled, and in the manner in which the thyratrons OT and CT are rendered conducting.

In the Fig. 2 modification, the anode 31 of the squeeze thyratron ST is connected to the conductor DL2 through an inductive reactance X1 and the anode 61 of the heat thyratron PT is connected to the conductor DL2 through a second inductive reactance X2. In addition to rectifiers RE6 and RE7, rectifiers RE13 and RE14 are connected, respectively, to the anodes 31 and 61. Rectifiers RE13 and RE14 are connected between the anodes and a common point AJ3, and are poled to conduct positive current from their associated anodes to the point AJ3.

In addition, in the modification shown in Fig. 2, the anode 211 of the thyratron AT is connected to the conductor AL1 through the exciting coil of the relay RW and the cathode 213 is connected to the conductor AL2. The thyratron AT is controlled by a circuit including a time constant network AN consisting of a capacitor 305 and a resistor 307 and having a short time constant of the order of a period of the supply. The common point AJ3 is connected to the control electrode of thyratron AT through the network AN. The circuit including the rectifiers RE13 and RE14 and network AN is a control circuit for thyratron AT different from the Fig. 1 control circuit.

The other features included in the Fig. 2 modification are provisions for the synchronous firing of thyratrons OT and CT. To fire thyratron OT synchronously, a resistor R7 and a rectifier RE15 are connected between the conductors AL2 and AL3, with the rectifier RE15 poled to conduct positive current from the conductor AL2 to the conductor AL3 and a second rectifier RE16 and a reactor X3 are connected between the conductor AL2 and the conductor DL2 with the rectifier RE16 poled to conduct positive current from the conductor DL2 to the conductor AL2. The junction J6 of the rectifier RE15 and the resistor R7 is electrically the same as the junction of the rectifier RE16 and the reactor X3. The junction J6 is also connected through the secondary AS4 of the transformer AT4 and the network ON to the control electrode of the thyratron OT. To fire thyratron PT synchronously, another set of two rectifiers RE17 and RE18, a resistor R8 and a reactor X4 are connected between the conductors DL1, AL1, and AL2. Rectifier RE17 is poled to conduct positive current from conductor AL2 to conductor AL1, and rectifier RE18 is poled to conduct positive current from conductor DL1 to conductor AL2. The rectifiers RE17 and RE18 and the resistor and reactor, respectively, have a common junction J7, which is connected to the control electrode 65 through network CN and secondary AS3.

The values of the components used in the synchronizing circuits are not at all critical. But, the following requirements should be met. The resistors R7 and R8 should be of such a value as to produce a stable drop across rectifiers RE15 and RE18 respectively. They should produce a current flow which is well within the rating of the associated rectifiers but is not so low as to make the action of the rectifier dubious. I have found that 4700 ohms is a good value for these resistors but is not critical at all. The reactors X4 and X3 should have an impedance which will insure that the curernt flow through them and associated rectifiers RE18 and RE16 will continue for at least 5 or 10 degrees beyond the zero voltage point of the supply. Again the value is not critical except that the hang on should be long enough to insure that the anode voltage of the associated tube can have reached a sufficient magnitude for that tube to fire. Since for type 2050 thyratrons such as are employed in this circuit, the anode voltage should be on the order of 20 volts for the tube to reliably fire, and since a 115 volt anode supply is used, the hang on need be only a few degrees. In addition, the impedance of the inductances should be such that the current flow through the associated rectifiers RE18 and RE16 will not exceed the allowable ratings of these rectifiers. I have found that most any iron core reactor which will pass current within the rating of the rectifiers will also produce the required hang on. The forward potential drops of the rectifiers is also not critical but should be somewhere between three and ten volts for best results. The drop should be sufficient in the negative direction to maintain the associated thyratrons non-conducting with the particular anode voltage that is applied to the associated thyratrons. For 2050 thyratrons with 115 volt anode supply, the control grid need be only three volts negative to insure that the tube will not conduct. I have found that 75 milliamp selenium rectifiers which are commonly available on the market fit these conditions quite well.

Stand-by Figure 2

In the stand-by condition of the Fig. 2 apparatus, thyratron PT is conducting, and thyratron ST is non-conducting, as has been explained. Since thyratron ST is non-conducting, the network AN is charged during the half periods when conductor DL2 is positive relative to conductor AL2 from the conductor DL2 through the rectifier RE13 connected to the anode of thyratron ST in such a sense as to block thyratron AT. Thus, in the stand-by condition of the apparatus shown in Fig. 2, thyratron AT is non-conducting as it is in the stand-by condition of the apparatus shown in Fig. 1.

In the stand-by condition of the apparatus, current flows between conductor DL2 and conductor AL2 through rectifier RE16 during the half periods during which conductor DL2 (or AL3) is positive relative to conductor AL2. Because of the inductive reactance of reactor X3, this current flow carries over into the succeeding half periods of the supply, and a small potential equal to the potential drop across the rectifier RE15 appears at junction J6 at the beginning of these half periods. During the remainder of these half periods, that is the half periods when conductor AL2 is positive, relative to conductor AL3, a small negative potential equal to the drop across rectifier RE15 is impressed on junction J6. The cathode return for thyratron OT is at this time open, and thyratron OT is non-conducting. Network ON is uncharged. It is to be noted that the half periods at the beginning of which a small positive potential appears at J6 and during the remainder of which the potential is negative are the half periods during which thyratron OT is capable of conducting.

Similarly, a small positive potential appears at junction J7 at the beginning of the half periods when conductors DL1 and AL1 are negative, relative to conductor AL2, and a small negative potential appears at junction J7 during the remainder of the same half periods. It is during these same half periods that thyratron CT is capable of conducting.

*Operation Figure 2*

The operation of the Fig. 2 system may be considered with the system set for pulsation welding and the switch SPS closed. To start the operation, the switch FS is closed connecting the cathode of the thyratron OT to the conductor AL2. Thyratron OT now becomes conducting, but it becomes conducting in synchronism with the supply at the beginning of the positive half period of anode-cathode potential impressed on it. This mode of operation derives from the circuit connected to the junction J6. The thyratron OT can only conduct during the half period when its anode is positive relative to its cathode, that is, during the half periods when the conductor DL1 is positive relative to the conductor AL2. During these half periods, the control electrode of thyratron OT may be positive only during a few degrees at the beginning of the half periods when the conduction through the inductive reactance X3 at junction J6 is carried over. During the remainder of the half period, the rectifier RE16 connected to the inductive reactance X3 is non-conducting because the potential from the conductor DL2 is negative, and the potential of the control electrode 185 is determined predominantly by the drop across the other rectifier RE15 at the junction J6 and is negative by a small magnitude. Thus, regardless of when the switch FS is closed, the thyratron OT can only conduct during the short time interval during which the potential across the rectifier RE16 in series with the inductive reactance X3 is positive because of the carry-over effect, and this is only at the beginning of the positive half period of anode-cathode potential on thyratron OT.

After thyratron OT is rendered conducting, the operation progresses in the same manner as in the Fig. 1 system until thyratron ST is rendered conducting. At this point, the charging potential for network AN is reduced and the network discharges. The resistance 307 of this network is of such magnitude relative to the capacitor 305 that the network discharges in a short interval of the order of a half period of the supply or less. With the network AN discharged, thyratron AT becomes conducting, actuating relay RW, and causing current to flow through the work W which is being welded.

When the thyratron ST becomes conducting, the charging of the heat network PN is discontinued and the latter discharges, and in the same manner as in the Fig. 1 system, the cool thyratron CT is eventually rendered conducting. The cool network CN is now charged to render thyratron PT non-conducting. With thyratron PT non-conducting, network AN is charged from conductor DL2 through the rectifier RE13 connected to the anode of thyratron PT, and thyratron AT is rendered nonconducting. Relay RW is now deenergized and the flow of welding current stops. The rendering nonconducting of the thyratron PT results in the charging of network PN and the rendering non-conducting of the thyratron CT. Network CN now discharges during the cool interval eventually again rendering thyratron PT conducting. Because of the action of the network including resistor R8, reactor X4, and rectifiers RE17 and RE18, thyratron CT is rendered conducting at the beginning of the positive half periods of the supply. The operation of the Fig. 2 apparatus now continues in the same manner as has been described for the Fig. 1 apparatus.

*Conclusion*

I have here disclosed a system of relatively simple structure and of low cost for producing at the will of an operator, either pulsation welding or spot welding. While my invention is illustrated with respect to certain specific embodiments thereof, many modifications of my invention are possible. My invention, therefore, is not to be restricted except insofar as is necessitated by the spirit of the prior art.

I claim as my invention:

1. In combination, an electric discharge device having a control electrode and a plurality of principal electrodes; means for impressing between the principal electrodes a potential for maintaining said device conducting for the proper control potential between the control electrode and one of the principal electrodes; and means for impressing in series between the control electrode and one of the principal electrodes a composite control potential consisting of a blocking bias which when impressed alone blocks the conduction of said device, a first potential of a polarity such as to tend to render said device conducting but alone insufficient in magnitude to render said device conducting with said blocking bias impressed and a second potential of a polarity such as to tend to render said device conducting but alone insufficient in magnitude to render said device conducting with said blocking bias impressed, said first and second potentials having a sufficient total magnitude when impressed together to render said device conducting.

2. In combination, an electric discharge device having a control electrode and a plurality of principal electrodes; means for impressing between the principal electrodes a potential for maintaining said device conducting for the proper control potential between the control electrode and one of the principal electrodes; means for impressing between the control electrode and one of the principal electrodes a blocking bias which when impressed alone blocks the conduction of said device; means for impressing between the control electrode and the one principal electrode in the stand-by condition of said combination, a first potential of a polarity such as to tend to render said device conducting but alone insufficient in magnitude to render said device conducting with said blocking bias impressed; means for initiating the operation of said combination; and means for thereafter impressing between the control electrode and the one principal electrode a second potential of a polarity such as to tend to render said device conducting but alone insufficient in magnitude to render said device conducting with said blocking bias impressed, said first and second potentials having a sufficient total magnitude when impressed together to render said device conducting.

3. In combination, an electric discharge device having a control electrode and a plurality of principal electrodes; means for impressing between the principal electrodes a potential for maintaining said device conducting for the proper control potential between the control electrode and one of the principal electrodes; means for impressing between the control electrode and one of the principal electrodes a blocking bias which when impressed alone blocks the conduction of said device; means for impressing between the control electrode and the one principal electrode in the stand-by condition of said combination, a first potential of a polarity such as to tend to render said device conducting but alone insufficient in magnitude to render said device conducting with said blocking bias impressed; means for initiating the operation of said combination; and means for thereafter impressing for a predetermined time interval only between the control electrode and the one principal electrode a second potential of a polarity such as to tend to render said device conducting but alone insufficient in magnitude to render said device conducting with said blocking bias impressed, said first and second potentials having a sufficient total magnitude when impresed together to render said device conducting.

4. In combination, a first electric discharge device having an anode, a cathode and a control electrode; means for impressing between the anode and cathode a potential such as to maintain the device conducting with the proper control potential impressed between the control electrode and the cathode; a blocking bias capable of preventing conduction of the device when alone impressed between the control electrode and cathode; a first transformer having a primary and a secondary; a second transformer having a primary and a secondary; means connecting in series the bias, the secondary of the first transformer and the secondary of the second transformer; a second electric discharge device having an anode and a cathode; a third electric discharge device having an anode and a cathode; means connecting the primary of the first transformer in series with the anode and the cathode of the second device; means connecting the primary of the second transformer in series with the anode and the cathode of the third device; means maintaining the second device conducting in the stand-by condition of the combination; means for initiating the operation of the combination; and means for thereafter rendering the third device conducting; the first and second transformers being such that when either the second device or the third device is conducting, potential is induced in the corresponding secondaries such as to tend to counteract the blocking bias but not to counteract it but when both the second device and the third device are conducting, potential is induced in the secondary such as to counteract the blocking bias, and render the first device conducting.

5. In combination, a first electric discharge device having an anode, a cathode and a control electrode; means for impressing between the anode and cathode a potential such as to maintain the device conducting with the proper control potential impressed between the control electrode and the cathode; a blocking bias capable of preventing conduction of the device when alone impressed between the control electrode and cathode; a first transformer having a primary and a secondary; a second transformer having a primary and a secondary; means connecting in series the bias, the secondary of the first transformer and the secondary of the second transformer; a second electric discharge device having an anode and a cathode; a third electric discharge device having an anode and a cathode; means connecting the primary of the first transformer in series with the anode and the cathode of the second device; means connecting the primary of the second transformer in series with the anode and the cathode of the third device; means maintaining the second device conducting in the stand-by condition of the combination; means for initiating the operation of the combination; means for thereafter rendering the third device conducting; and means for rendering the second device non-conducting after the third device has been rendered conducting; the first and second transformers being such that when either the second device or the third device is conducting, potential is induced in the corresponding secondaries such as to tend to counteract the blocking bias but not to counteract it but when both the second device and the third device are conducting, potential is induced in the secondaries such as to counteract the blocking bias, and render the first device conducting.

6. In combination, an electric discharge device having a control electrode and a plurality of principal electrodes; means for impressing between the principal electrodes a potential for maintaining said device conducting for the proper control potential between the control electrode and one of the principal electrodes; means for impressing between the control electrode and one of the principal electrodes a blocking bias which when impressed alone blocks the conduction of said device; means for impressing between the control electrode and the one principal electrode in the stand-by condition of said combination, a first potential of a polarity such as to tend to render said device conducting but alone insufficient in magnitude to render said device conducting with said blocking bias impressed; means for initiating the operation of said combination; means for thereafter impressing for a predetermined time interval only between the control electrode and the one principal electrode a second potential of a polarity such as to tend to render said device conducting but alone insufficient in magnitude to render said device conducting with said blocking bias impressed, said first and second potentials having a sufficient total magnitude when impressed together to render said device conducting; and means for interrupting the impressing of the first potential after the second potential is impressed as aforesaid.

7. In combination, a first conductor for supplying potential; a second conductor for supplying potential, a first electric discharge path having an anode and a cathode; a second electric discharge path having an anode and a cathode; a first rectifier means; second rectifier means; means connecting the anode of the first path to the first conductor; means connecting the anode of the second path to the first conductor; means connecting the first rectifier means between the anode of the first path and a common electrical point, the rectifier means being poled to conduct positive current from the last-named anode to the point; means connecting the second rectifier means between the anode of the second path and the point, the second rectifier means being poled to conduct positive current from the last-named anode to the point; means connecting the cathode of the first path to the second conductor; means connecting the cathode of the second path to the second conductor; and means for deriving a control potential from the electrical point.

8. In combination, a first conductor for supplying potential; a second conductor for supplying potential, a first electric discharge path having an anode and a cathode; a second electric discharge path having an anode and a cathode; a first rectifier means; second rectifier means; means connecting the anode of the first path to the first conductor; means connecting the anode of the second path to the first conductor; means connecting the first rectifier means between the anode of the first path and a common electrical point, the rectifier means being poled to conduct positive current from the last-named anode to the point; means connecting the second rectifier means between the anode of the second path and the point, the second rectifier means being poled to conduct positive current from the last-named anode to the point; means connecting the cathode of the first path to the second conductor; means connecting the cathode of the second path to the second conductor; a time constant network; and means connecting said network between the point and the second conductor.

9. In combination, a first conductor for supplying potential; a second conductor for supplying potential, a first electric discharge path having an anode and a cathode; a second electric discharge path having an anode and a cathode; a first rectifier means; a second rectifier means; means connecting the anode of the first path to the first conductor; means connecting the anode of the second path to the first conductor; means connecting the first rectifier means between the anode of the first path and a common electrical point, the rectifier means being poled to conduct positive current from the last-named anode to the point; means connecting the second rectifier means between the anode of the second path and the point, the second rectifier means being poled to conduct positive current from the last-named anode to the point; means connecting the cathode of the first path to the second conductor; means connecting the cathode of the second path to the second conductor; means for selectively controlling the conductivity of the first and second paths; and means for deriving a control potential from the electrical point.

10. In combination, a first conductor for supplying potential; a second conductor for supplying potential, a third conductor for supplying a potential, means for connecting the conductors so that when the conductors are energized the second conductor is at a potential intermediate the first and third conductors; a first electric discharge path having an anode and a cathode; a second electric discharge path having an anode and a cathode; a third electric discharge path having an anode, a cathode and a control electrode; a first rectifier means; second rectifier means; means connecting the anode of the first path to the first conductor; means connecting the anode of the second path to the first conductor; means connecting the first rectifier means between the anode of the first path and a common electrical point, the rectifier means being poled to conduct positive current from the last-named anode to the point; means connecting the second rectifier means between the anode of the second path and the point, the second rectifier means being poled to conduct positive current from the last-named anode to the point; means connecting the cathode of the first path to the second conductor; means connecting the cathode of the second path to the second conductor; means connecting the anode of the third path to the third conductor; means connecting the cathode of the third path to the second conductor; and control means for the third path connected between the control electrode and the point.

11. In combination, a first conductor for supplying power; a second conductor for supplying power; a third conductor for supplying power; means for maintaining said third conductor at a potential intermediate the potentials of said first and second conductors when said conductors are energized; a first electric discharge path having an anode, a cathode and a control electrode; a time constant network; first rectifier means; second rectifier means; a second electric discharge path having an anode and a cathode; a third electric discharge path having an anode and a cathode; means connecting the anode of the first path to the first conductor, means connecting the cathode of the first path to the third conductor; means connecting the anode of the second path to the second conductor; means connecting the cathode of the second path to the third conductor; means connecting the anode of the third path to the second conductor, means connecting the cathode of the third path to the third conductor; means connecting the first rectifier means between the anode of the second path and a common electrical point, the last-named rectifier means being poled to conduct positive current from the anode to the point; means connecting the second rectifier means between the anode of the third path and the point, the last-named rectifier means being poled to conduct positive current from the anode to the point; means including the time constant network connecting the point to the control electrode; means for maintaining the second path normally conducting; means maintaining the third path normally nonconducting; means for initiating the operation of the combination; means for thereafter rendering the third path conducting; and means for rendering the third path nonconducting a predetermined time interval after it has been rendered conducting.

References Cited in the file of this patent

UNITED STATES PATENTS

| | | |
|---|---|---|
| 2,461,895 | Hardy et al. | Feb. 15, 1949 |
| 2,542,152 | McConnell | Feb. 26, 1951 |
| 2,574,939 | Stanback et al. | Nov. 13, 1951 |